United States Patent
Smith et al.

(10) Patent No.: US 10,554,713 B2
(45) Date of Patent: Feb. 4, 2020

(54) LOW LATENCY APPLICATION STREAMING USING TEMPORAL FRAME TRANSFORMATION

(71) Applicant: Microsoft Technology Licensing, LLC, Redmond, WA (US)

(72) Inventors: Brian Smith, Redmond, WA (US); Eduardo Alberto Cuervo Laffaye, Bellevue, WA (US); David Chiyuan Chu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 441 days.

(21) Appl. No.: 14/744,860

(22) Filed: Jun. 19, 2015

(65) Prior Publication Data
US 2016/0373502 A1 Dec. 22, 2016

(51) Int. Cl.
*H04L 29/06* (2006.01)
*G06F 15/173* (2006.01)
(Continued)

(52) U.S. Cl.
CPC .............. *H04L 65/601* (2013.01); *G06F 3/16* (2013.01); *H04L 65/80* (2013.01); *H04L 67/42* (2013.01);
(Continued)

(58) Field of Classification Search
CPC ....... H04L 65/601; H04L 65/80; H04L 67/42; G06F 3/16
See application file for complete search history.

(56) References Cited

U.S. PATENT DOCUMENTS 6,359,603 B1    3/2002    Zwern
6,415,317 B1    7/2002    Yelon et al.
(Continued)

FOREIGN PATENT DOCUMENTS

CN    102036095 A    4/2011
CN    102142152 A    8/2011
(Continued)

OTHER PUBLICATIONS

Eduardo Cuervoy, Alec Wolmany, Landon P. Coxz, Kiron Lebeck, Ali Razeenz, Stefan Saroiuy, Madanlal Musuvathi; Kahawai: High-Quality Mobile Gaming Using GPU Offload, MobiSys'15, May 18-22, 2015, Florence, Italy.*
(Continued)

*Primary Examiner* — Kevin T Bates
*Assistant Examiner* — Mark A Scott
(74) *Attorney, Agent, or Firm* — Ray Quinney & Nebeker PC; Thomas M. Hardman; Henry Gabryjelski (57) ABSTRACT

The present describes low latency streaming using temporal frame transformation. An execution component in an edge server executes a first instance of an application. A server interface component receives, from a remote server, a resolution delta frame indicating differences between a high resolution first frame and a low resolution first frame of a second instance of the application or, alternatively, receives the high resolution first frame. A video manipulation component generates a motion delta frame by identifying differences between a low resolution first frame and a low resolution second frame of the first instance of the application. The video manipulation component generates a high resolution transformed frame by applying the resolution delta frame and the motion delta frame to the low resolution second frame.

20 Claims, 7 Drawing Sheets

(51) Int. Cl.
  *G06F 15/177* (2006.01)
  *G06F 11/14* (2006.01)
  *G06F 3/16* (2006.01)
  *H04N 19/51* (2014.01)
  *H04N 19/33* (2014.01)
  *H04N 19/59* (2014.01)
  *H04N 19/61* (2014.01)

(52) U.S. Cl.
  CPC ............ *H04N 19/33* (2014.11); *H04N 19/51* (2014.11); *H04N 19/59* (2014.11); *H04N 19/61* (2014.11)

(56) References Cited

U.S. PATENT DOCUMENTS

| | | |
|---|---|---|
| 7,068,274 B2 | 6/2006 | Welch et al. |
| 7,224,382 B2 | 5/2007 | Baker |
| 7,627,632 B2 | 12/2009 | Douceur et al. |
| 8,009,022 B2 | 8/2011 | Kipman et al. |
| 8,203,568 B2 | 6/2012 | Clemie et al. |
| 8,248,405 B1 | 8/2012 | O'Donnell |
| 8,386,560 B2 | 2/2013 | Ma et al. |
| 8,402,155 B2 | 3/2013 | Glow |
| 8,403,757 B2 | 3/2013 | Mizrachi |
| 8,433,771 B1 | 4/2013 | Ellsworth et al. |
| 8,514,705 B2 | 8/2013 | Niamut et al. |
| 8,537,899 B1 | 9/2013 | Taylor |
| 8,566,696 B1 | 10/2013 | Hamon et al. |
| 8,583,763 B1 | 11/2013 | Kim et al. |
| 8,643,701 B2 | 2/2014 | Nguyen et al. |
| 8,648,870 B1* | 2/2014 | Shankaranarayana ............ H04L 65/4092 345/531 |
| 8,774,267 B2 | 7/2014 | Gaddy et al. |
| 8,903,958 B1 | 12/2014 | Chavez et al. |
| 9,661,312 B2 | 5/2017 | Chu et al. |
| 9,686,520 B2 | 6/2017 | Chu et al. |
| 9,756,375 B2 | 9/2017 | Chu et al. |
| 9,824,498 B2 | 11/2017 | Mallinson |
| 2002/0010798 A1 | 1/2002 | Ben-Shaul et al. |
| 2002/0158873 A1 | 10/2002 | Williamson |
| 2003/0185456 A1 | 10/2003 | Sato et al. |
| 2003/0210744 A1 | 11/2003 | Porikli et al. |
| 2004/0130549 A1 | 7/2004 | Tinker et al. |
| 2005/0060421 A1 | 3/2005 | Musunuri et al. |
| 2005/0213833 A1 | 9/2005 | Okada et al. |
| 2007/0041664 A1 | 2/2007 | Yamada |
| 2007/0058730 A1* | 3/2007 | Bowra ............... H04N 21/2389 375/240.28 |
| 2008/0165176 A1 | 7/2008 | Archer et al. |
| 2009/0013281 A1 | 1/2009 | Helfman et al. |
| 2009/0046094 A1 | 2/2009 | Hamilton et al. |
| 2009/0115879 A1 | 5/2009 | Nagata et al. |
| 2010/0166063 A1* | 7/2010 | Perlman ............ H04N 21/2343 375/240.07 |
| 2010/0167816 A1* | 7/2010 | Perlman ................. A63F 13/12 463/30 |
| 2010/0265248 A1 | 10/2010 | Mccrae et al. |
| 2010/0281402 A1 | 11/2010 | Staikos et al. |
| 2011/0133887 A1 | 6/2011 | Tian et al. |
| 2011/0191679 A1 | 8/2011 | Lin et al. |
| 2011/0268190 A1 | 11/2011 | Morphet et al. |
| 2012/0069131 A1 | 3/2012 | Abelow |
| 2012/0072608 A1 | 3/2012 | Peters et al. |
| 2012/0105448 A1 | 5/2012 | Kim |
| 2012/0141042 A1 | 6/2012 | Iketani |
| 2012/0184373 A1 | 7/2012 | Kim et al. |
| 2012/0254780 A1 | 10/2012 | Mouton et al. |
| 2012/0256949 A1 | 10/2012 | Treat et al. |
| 2012/0266068 A1 | 10/2012 | Ryman et al. |
| 2012/0281557 A1* | 11/2012 | Carter ................. H04L 45/308 370/252 |
| 2012/0311107 A1* | 12/2012 | Van der Merwe .... H04L 41/083 709/220 |
| 2012/0311130 A1* | 12/2012 | Zadig .................... H04L 12/66 709/224 |
| 2013/0014064 A1 | 1/2013 | Zhu et al. |
| 2013/0073689 A1 | 3/2013 | Kolam et al. |
| 2013/0091251 A1* | 4/2013 | Walker ............... H04N 21/6125 709/219 |
| 2013/0091286 A1* | 4/2013 | Spencer ................ H04L 47/25 709/226 |
| 2013/0123004 A1 | 5/2013 | Kruglick |
| 2013/0123019 A1* | 5/2013 | Sullivan ................. A63F 13/86 463/42 |
| 2013/0132510 A1* | 5/2013 | Ye ........................ H04N 21/226 709/217 |
| 2013/0145035 A1* | 6/2013 | Pope ...................... H04L 65/60 709/227 |
| 2013/0147820 A1 | 6/2013 | Kalai et al. |
| 2013/0215220 A1 | 8/2013 | Wang et al. |
| 2013/0247117 A1 | 9/2013 | Yamada et al. |
| 2013/0254417 A1* | 9/2013 | Nicholls ............... G06F 9/5027 709/231 |
| 2013/0268807 A1* | 10/2013 | Spencer ............. H04L 65/4084 714/18 |
| 2013/0304798 A1 | 11/2013 | Chang et al. |
| 2013/0314501 A1 | 11/2013 | Davidson et al. |
| 2013/0321396 A1 | 12/2013 | Kirk et al. |
| 2013/0321586 A1 | 12/2013 | Kirk et al. |
| 2013/0324242 A1* | 12/2013 | Vincent ................. A63F 13/06 463/31 |
| 2013/0342460 A1* | 12/2013 | Vincent ................. G06F 3/0338 345/161 |
| 2014/0009574 A1 | 1/2014 | Hannuksela et al. |
| 2014/0050082 A1 | 2/2014 | Sun et al. |
| 2014/0064607 A1 | 3/2014 | Grossmann et al. |
| 2014/0132715 A1 | 5/2014 | Raghoebardayal et al. |
| 2014/0136952 A1 | 5/2014 | Zhu et al. |
| 2014/0173674 A1* | 6/2014 | Wolman .................. H04N 21/25 725/116 |
| 2014/0176591 A1 | 6/2014 | Klein et al. |
| 2014/0195653 A1* | 7/2014 | Alexander ............... H04L 67/10 709/219 |
| 2014/0274368 A1* | 9/2014 | Cotter ................... A63F 13/355 463/31 |
| 2014/0310405 A1* | 10/2014 | Pope ........................ H04L 69/16 709/224 |
| 2014/0344469 A1* | 11/2014 | Nicholls ............... H04L 65/607 709/231 |
| 2014/0375634 A1 | 12/2014 | Hillesland et al. |
| 2015/0011311 A1* | 1/2015 | Relan ................... A63F 13/355 463/31 |
| 2015/0036695 A1* | 2/2015 | Gowda .................. H04L 47/283 370/474 |
| 2015/0049800 A1* | 2/2015 | Chen .................... H04N 19/103 375/240.02 |
| 2015/0052193 A1* | 2/2015 | Farrell .................. H04L 65/608 709/203 |
| 2015/0103880 A1* | 4/2015 | Diard ................... H04N 19/162 375/240.02 |
| 2015/0127774 A1* | 5/2015 | Hitomi .................... H04L 65/60 709/219 |
| 2015/0165322 A1* | 6/2015 | Gault .................... A63F 13/10 463/31 |
| 2015/0178018 A1* | 6/2015 | Colenbrander ....... G06F 3/0664 711/154 |
| 2015/0189234 A1* | 7/2015 | Shapiro ..................... H04N 7/15 348/14.08 |
| 2015/0222589 A1* | 8/2015 | O'Connor .............. G06F 16/95 370/254 |
| 2015/0234455 A1 | 8/2015 | Lavalle et al. |
| 2015/0262410 A1* | 9/2015 | Arun ...................... G06F 9/4881 345/419 |
| 2015/0363976 A1 | 12/2015 | Henson |
| 2016/0021149 A1* | 1/2016 | Maistri .................. H04L 65/403 348/14.08 |
| 2016/0023109 A1 | 1/2016 | Colenbrander |
| 2016/0027143 A1* | 1/2016 | Amidei ..................... G06T 1/20 345/522 |
| 2016/0086379 A1 | 3/2016 | Sadi et al. |

(56) References Cited

U.S. PATENT DOCUMENTS

| | | | |
|---|---|---|---|
| 2016/0092021 A1 | 3/2016 | Tu et al. | |
| 2016/0093105 A1 | 3/2016 | Rimon et al. | |
| 2016/0094866 A1* | 3/2016 | Frazzini | H04N 21/2668 725/10 |
| 2016/0134673 A1* | 5/2016 | MacInnis | H04L 65/60 709/231 |
| 2016/0205156 A1* | 7/2016 | Brelivet | H04L 65/4069 709/231 |
| 2016/0205164 A1* | 7/2016 | Schmidt | H04L 1/0001 709/219 |
| 2016/0217760 A1 | 7/2016 | Chu et al. | |
| 2016/0219267 A1 | 7/2016 | Chu et al. | |
| 2016/0219325 A1 | 7/2016 | Chu et al. | |
| 2016/0234536 A1* | 8/2016 | Stockhammer | H04L 67/02 |
| 2016/0293133 A1 | 10/2016 | Dutt | |
| 2016/0330264 A1* | 11/2016 | Chang | H04L 65/607 |
| 2017/0094262 A1 | 3/2017 | Peterson et al. | |
| 2017/0237797 A1* | 8/2017 | Muthiah | H04L 29/0651 709/219 |
| 2017/0257609 A1 | 9/2017 | Chu et al. | |

FOREIGN PATENT DOCUMENTS

| | | |
|---|---|---|
| CN | 103188988 A | 7/2013 |
| CN | 103426163 A | 12/2013 |
| CN | 103914582 A | 7/2014 |

OTHER PUBLICATIONS

"Amazon CloudFront", Published on: Nov. 14, 2013 Available at: http://aws.amazon.com/cloudfront/.

Choy, et al., "A Hybrid Edge-Cloud Architecture for Reducing On-Demand Gaming Latency", In Proceedings of Multimedia Systems, vol. 20, No. 5, Oct. 2014, 32 pages.

Eduardo Cuervo et al.; "Kahawai: High-Quality Mobile Gaming Using GPU Offload"; Microsoft Research, Duke University, University of Washington; MobiSys '15 Proceedings of the 13th Annual International Conference on Mobile Systems, Applications, and Services; May 18-22, 2015; Copyright ACM 978-1-4503-3494—May 15, 2015; 15 Pages.

Kyungmin Lee et al; "Using Speculation to Enable Low-Latency Continuous Interaction for Cloud Gaming"; University of Michigan, Microsoft Research, Siberian Federal University; Published Mobisys '15 Proceedings of the 13th Annual International Conference on Mobile Systems, Applications, and Services; Copyright ACM 978-1-4503-3494-5; May 18-22, 2015; pp. 151-165.

"International Search Report and Written Opinion Issued in PCT Application No. PCT/US2016/036541", dated Sep. 21, 2016, 11 Pages.

"International Preliminary Report on Patentability Issued in PCT Application No. PCT/US2016/036541", dated Jun. 1, 2017, 5 Pages.

"Amazon AppStream", Retrieved from https://web.archive.org/web/20140915223832/http://aws.amazon.com/appstream/, Retrieved on Sep. 11, 2014, 8 Pages.

"Intel® Quick Sync Video", Retrieved from https://web.archive.org/web/20141001095343/http://www.intel.com/content/www/us/en/architecture-and-technology/quick-sync-video/quick-sync-video-general.html, Retrieved on Oct. 1, 2014, 4 Pages.

"Nvidia Grid™ Cloud Gaming Beta", Retrieved from https://web.archive.org/web/20140916034916/http://shield.nvidia.com/grid, Retrieved on Sep. 11, 2014, 3 Pages.

Zielinski, et al., "Exploring the Effects of Image Persistence in Low Frame Rate Virtual Environments", In Proceedings of IEEE Virtual Reality, Mar. 23, 2015, pp. 19-26.

"Nvidia Video Codec SDK", Retrieved from https://web.archive.org/web/20141209194747/https://developer.nvidia.com/nvidia-video-codec-sdk, Retrieved on Sep. 11, 2014, 3 Pages.

"PlayStation™ Now PS4™ Open Beta Now Live!", Retrieved from https://web.archive.org/web/20140813052742/http://www.playstation.com/en-us/explore/psnow, Retrieved on Sep. 11, 2014, 4 Pages.

Winstein, et al., "Mosh: An Interactive Remote Shell for Mobile Clients", In Proceedings of the USENIX Conference on Annual Technical Conference, Jun. 13, 2012, 6 Pages.

"Sponging is No Longer a Myth", Retrieved from http://youtu.be/Bt433RepDwM, Apr. 2, 2013, 4 Pages.

"Unreal Networking Architecture", Retrieved from https://docs.unrealengine.com/udk/Three/NetworkingOverview.html, Retrieved on Sep. 11, 2014, 21 Pages.

Wester, et al., "Operating System Support for Application-Specific Speculation", In Proceedings of the 6th Conference on Computer Systems, Apr. 10, 2011, 14 Pages.

"Non Final Office Action Issued in U.S. Appl. No. 14/603,253", dated Jul. 1, 2016, 9 Pages.

Welch, et al., "Motion Tracking: No Silver Bullet, but a Respectable Arsenal", In IEEE Computer Graphics and Application, vol. 22 Issue 6, Nov. 2002, 15 Pages.

"Final Office Action Issued in U.S. Appl. No. 14/603,276", dated Dec. 2, 2016, 25 Pages.

"Non Final Office Action Issued in U.S. Appl. No. 14/603,276", dated May 26, 2016, 24 Pages.

Wang, et al., "Addressing Response Time and Video Quality in Remote Server based Internet Mobile Gaming", In IEEE Wireless Communications and Networking Conference, Apr. 18, 2010, 6 Pages.

"Non Final Office Action Issued in U.S. Appl. No. 15/602,442", dated Apr. 9, 2018, 23 Pages.

"Non Final Office Action Issued in U.S. Appl. No. 15/691,608", dated Jun. 4, 2018, 21 Pages.

Allman, Mark, "Comments on Bufferbloat", In ACM SIGCOMM Computer Communication Review, vol. 43, Issue 1, Jan. 9, 2013, 7 Pages.

Beigbeder, et al., "The Effects of Loss and Latency on user Performance in Unreal Tournament", In Proceedings of 3rd ACM SIGCOMM Workshop on Network and System Support for Games, Aug. 30, 2004, 8 Pages.

Bharambe, et al., "Colyseus: A Distributed Architecture for Online Multiplayer Games", In Proceedings of the 3rd Conference on Networked Systems Design & Implementation, vol. 3, May 8, 2006, 14 Pages.

Bharambe, et al., "Donnybrook: Enabling Large-Scale, High-Speed, Peer-to-Peer Games", In Proceedings of the ACM SIGCOMM Conference on Applications, Technologies, Architectures, and Protocols for Computer, Aug. 17, 2008, 12 Pages.

Buehler, et al., "Unstructured Lumigraph Rendering", In Proceedings of the 28th Annual Conference on Computer Graphics and Interactive Techniques, Aug. 12, 2001, 8 Pages.

Chaudhuri, et al., "Distributed Rendering of Virtual Worlds", In Technical Report of CSTR, Feb. 2008, 9 Pages.

Chen, et al., "View Interpolation for Image Synthesis", In Proceedings of the 20th Annual Conference on Computer Graphics and Interactive Techniques, Sep. 9, 1993, pp. 279-288.

Chow, et al., "A Message Update Model for a Large-Scale Multi-User Networked Virtual Environment System", In Journal of Multimedia Cyberscape, Jul. 24, 2005, 12 Pages.

Chow, et al., "The ARP Virtual Reality System in Addressing Security Threats and Disaster Scenarios", In TENCON-IEEE Region 10 Conference, Nov. 21, 2005, 6 Pages.

Correa, et al., "Visibility-Based Prefetching for Interactive Out-of-Core Rendering", In Proceedings of the IEEE Symposium on Parallel and Large-Data Visualization and Graphics, Oct. 20, 2003, 8 Pages.

Debevec, et al., "Modeling and Rendering Architecture from Photographs: A Hybrid Geometry- and Image-Based Approach", In Proceedings of the 23rd Annual Conference on Computer Graphics and Interactive Techniques, Aug. 4, 1996, pp. 11-20.

Dick, et al., "Analysis of Factors Affecting Players' Performance and Perception in Multiplayer Games", In Proceedings of 4th ACM SIGCOMM Workshop on Network and System Support for Games, Oct. 10, 2005, 7 Pages.

(56) References Cited

OTHER PUBLICATIONS

Douceur, et al., "Leveraging Legacy Code to Deploy Desktop Applications on the Web", In Proceedings of 8th USENIX Conference on Operating Systems Design and Implementation, Dec. 8, 2008, 19 Pages.
Fernando, Randima, "GPU Gems: Programming Techniques, Tips and Tricks for Real-Time Graphics", Published by Addison-Wesley Professional, Apr. 1, 2004, 5 Pages.
Horvitz, et al., "Perception, Attention, and Resources: A Decision-Theoretic Approach to Graphics Rendering", In Proceedings of the 13th Conference on Uncertainty in Artificial Intelligence, Aug. 1, 1997, 22 Pages.
Huang, et al., "A Close Examination of Performance and Power Characteristics of 4G LTE Networks", In Proceedings of the 10th International Conference on Mobile Systems, Applications, and Services, Jun. 25, 2012, 14 Pages.
Huang, et al., "An In-Depth Study of LTE: Effect of Network Protocol and Application Behavior on Performance", In ACM SIGCOMM Computer Communication Review, vol. 43, Issue 4, Aug. 12, 2013, 12 Pages.
Jefferson, et al., "Distributed Simulation and the Time Warp Operating System", In Proceedings of the 11th ACM Symposium on Operating Systems Principles, Nov. 1, 1987, pp. 77-93.
Kalman, R. E., "A New Approach to Linear Filtering and Prediction Problems", In Journal of Basic Engineering, vol. 82, Issue 1, Mar. 1, 1960, 12 Pages.
Kan, Michael, "PopCap Games CEO: Android Still Too Fragmented, China Helping Company Innovate", Retrieved from http://www.pcworld.com/article/255373/popcap_games_ceo_android_still_too_fragmented_china_helping_company_innovate.html, May 10, 2012, 9 Pages.
Khaw, Cassandra, "Game Developers Still Not Sold on Android", Retrieved from https://web.archive.org/web/20130419111327/http://www.techhive.com/article/2032740/game-developers-still-not-sold-on-android.html, Apr. 2, 2013, 10 Pages.
Kniss, et al., "Interactive Texture-Based Volume Rendering for Large Data Sets", In IEEE Computer Graphics and Applications, vol. 21, Issue 4, Jul. 2001, pp. 52-61.
Lange, et al., "Experiences with Client-based Speculative Remote Display", In Proceedings of USENIX Annual Technical Conference, Jun. 22, 2008, pp. 419-432.
Lau, et al., "Motion Prediction for Online Gaming", In International Workshop on Motion in Games, 2008, pp. 104-114.
Liu, et al., "A Hybrid Method of Image Synthesis in IBR for Novel Viewpoints", In Proceedings of the ACM Symposium on Virtual Reality Software and Technology, Oct. 22, 2000, pp. 55-60.
Mark, et al., "Post-Rendering 3D Warping", In Proceedings of Symposium on Interactive 3D Graphics, Apr. 27, 1997, pp. 7-16.
Mickens, et al., "Crom: Faster Web Browsing using Speculative Execution", In Proceedings of the 7th USENIX Conference on Networked Systems Design and Implementation, Apr. 28, 2010, 16 Pages.
Nightingale, et al., "Speculative Execution in a Distributed File System", In Proceedings of the ACM Transactions on Computer Systems, vol. 24, No. 4, Nov. 2006, 361-392.
Pasman, et al., "Low Latency Rendering for Mobile Augmented Reality", In Proceedings of ASCI Research School Conference, Jun. 4, 1999, 7 Pages.
"International Preliminary Report on Patentability Issued in PCT Application No. PCT/US2015/067555", dated Apr. 19, 2017, 7 Pages.

"International Search Report and Written Opinion Issued in PCT Application No. PCT/US2015/067555", dated May 10, 2016, 12 Pages.
"Second Written Opinion Issued in PCT Application No. PCT/US2015/067555", dated Jan. 20, 2017, 6 Pages.
Quax, et al., "Objective and Subjective Evaluation of the Influence of Small Amounts of Delay and Jitter on a Recent First Person Shooter Game", In Proceedings of 3rd ACM SIGCOMM Workshop on Network and System Support for Games, Aug. 30, 2004, 5 Pages.
Regan, et al., "Priority Rendering with a Virtual Reality Address Recalculation Pipeline", In Proceedings of the 21st International Conference on Computer Graphics and Interactive Techniques, Jul. 24, 2017, 8 Pages.
Shade, et al., "Layered Depth Images", In Proceedings of the 25th Annual Conference on Computer Graphics and Interactive Techniques, Jul. 19, 1998, 12 Pages.
Shi, et al., "Using Graphics Rendering Contexts to Enhance the Real-Time Video Coding for Mobile Cloud Gaming", In Proceedings of the 19th ACM International Conference on Multimedia, Nov. 28, 2011, pp. 103-112.
Shum, et al., "Rendering with Concentric Mosaics", In Proceedings of the 26th Annual Conference on Computer Graphics and Interactive Techniques, Aug. 8, 1999, 8 Pages.
Sjoberg, et al., "Nonlinear Black-Box Modeling in System Identification: A Unified Overview", In Journal of Automatica, vol. 31, Issue 12, Jun. 21, 1995, 55 Pages.
Smit, et al., "A Shared-Scene-Graph Image-Warping Architecture for VR: Low Latency Versus Image Quality", In Proceedings of Computer & Graphics, vol. 34, Issue 1, Nov. 13, 2009, pp. 3-16.
Sommers, et al., "Cell vs. WiFi: On the Performance of Metro Area Mobile Connections", In Proceedings of the ACM Conference on Internet Measurement, Nov. 14, 2012, 14 Pages.
Sundaresan, et al., "Broadband Internet Performance: A View from the Gateway", In ACM SIGCOMM computer CommunicatioReview, vol. 41, No. 4, Aug. 15, 2011, 12 Pages.
Szeliski, Richard, "Computer Vision: Algorithms and Applications", In Publication of Springer-Verlag London, Sep. 30, 2010, 833 Pages.
Ta Chen, et al., "How Sensitive are Online Gamers to Network Quality?", In Magazine Communications of the ACM—Entertainment Networking, vol. 49, Issue 11, Nov. 2006, pp. 34-38.
Tate, Ryan, "As Android Rises, App Makers Tumble Into Google's 'Matrix of Pain'", Retrieved from https://www.wired.com/2013/08/android-matrix-of-pain/, Aug. 26, 2013, 5 Pages.
Verlani, et al., "Depth Images: Representations and Real-Time Rendering", In Proceedings of 3rd International Symposium on 3D Data Processing, Visualization, and Transmission, Jun. 14, 2006, 8 Pages.
"QuickSync Programmable Video Processor", Retrieved from: https://web.archive.org/web/20180902131536/https://www.intel.com/content/www/us/en/architecture-and-technology/quick-sync-video/quick-sync-video-general.html, Retrieved on: Sep. 2, 2018, 4 Pages.
"Sony Playstation now Streaming", Available at: https://web.archive.org/web/20181004161239/https://www.playstation.com/en-us/explore/playstation-now, Retrieved on: Oct. 4, 2018, 8 Pages.
"First Office Action and Search Report Issued in Chinese Patent Application No. 201580073961.8", dated Jul. 4, 2018, 9 Pages.
Google, "Native Client", Available at: http://youtu.be/Bt433RepDwM, accessed Nov. 26, 2018, 1 page.
"Office Action Issued in Chinese Patent Application No. 201680035962.8", dated Aug. 19, 2019, 14 Pages.

* cited by examiner

LOW LATENCY APPLICATION STREAMING USING TEMPORAL FRAME TRANSFORMATION

TECHNICAL FIELD

The present disclosure relates to low latency application streaming using temporal frame transformation.

BACKGROUND

Client devices, particularly mobile devices, equipped with high-resolution touchscreens, powerful processors, and graphics processing units (GPUs) are increasingly in use for many applications including those associated with interactive applications such as electronic gaming. As client device screens increase in size and resolution, finer graphical detail and advanced graphical effects are becoming more common for interactive applications. And the processing capabilities of client device GPUs are constantly improving. Even so, many client devices cannot yet provide the rich visual experience and sophisticated graphical detail found in dedicated gaming consoles or high-end desktop computers. Several reasons exist for this discrepancy including power consumption and size. A high-end desktop GPU may consume 500 watts, whereas a high-end client device GPU may consume less than 10 watts. Moreover, client device GPUs likely will continue to lag behind desktop GPUs since battery capacity of many client devices is limited given that larger capacity batteries are bulky and may be inconsistent with many client device form factors particularly mobile device form factors.

A common approach to address these issues is to develop a version of the interactive application specifically designed considering the constraints of the hardware included in particular client devices. Doing so, oftentimes results in a lack of graphical details, such as complex lighting, shadows, particles, fog, detailed textures, complex models, non-critical graphical objects such as blades of grass in the field, and the like. This approach is oftentimes employed in modern games to allow such games to run on underpowered hardware, such as low-end desktop and laptop computers. Thus, through custom graphics settings, different levels of visual detail and effects can be enabled or disabled (e.g., using a configuration screen) to obtain a sufficient level of detail while allowing the game to be rendered at a full frame rate.

Alternatively, execution of the interactive application may be fully or partially offloaded to a remote server to make the application more accessible to all users. Such an approach may utilize general-purpose workloads running on the central processing units (CPUs) of the client devices. Or execution of game logic and rendering may be offloaded to a remote server using a thin client architecture in which the client device (thin client) receives and transmits user input to the server. The server, in turn, executes the game logic and rendering based on the received user input and provides the resulting audio-visual or visual only output encoded as compressed video to the client device. This approach is vulnerable to excessive latency if the server is not relatively geographically close to the client. Excessive latency may adversely and undesirably affect the user gaming experience. A need remains, therefore, for improved low latency interactive application solutions.

BRIEF DRAWINGS DESCRIPTION

The present disclosure describes various embodiments that may be understood and fully appreciated in conjunction with the following drawings.

DETAILED DESCRIPTION

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure that is not to be limited except by the claims.

Remote rendering and streaming of interactive applications may involve a user on a client device that may interact with a remote server. The remote server may render the interactive application frames and audio and may stream the resulting audiovisual output stream to a client device via a network. Given the general availability of rendering and encoding hardware, a differentiator of the user experience is perceived latency, which may be defined as a time between the user providing input to the application and the user observing the result of that input. A factor that may influence perceived latency is a physical distance between the client device and the remote server that renders the application. Unfortunately, a factor that influences cost is the location of the remote server. Latency has been improved by geographically locating render servers close to the client devices that receive user input. Unfortunately, many such users cluster in dense metropolitan areas that lack availability of large spaces to locate large datacenters that include remote servers. And the space tends to cost a premium in metropolitan areas. Given the high cost of space in metropolitan areas and its limited availability, it is often challenging to provide low latency capacity for many of these markets using remote servers in datacenters.

The techniques described herein may allow leveraging geographically distant or remote, cost effective, servers in datacenters that do not introduce undesirable levels of latency to adversely affect the user interactive experience. The techniques described herein may further enable a client device to offload high performance graphics rendering and processing to a remote server and an edge server in a manner that ensures low latency. The client device may interact with the remote server and the edge server in a common streaming model. The remote server, located geographically remote from the client device, may execute a second instance of the application and may render a first high resolution frame and a first low resolution frame of the application. In an embodiment, the remote server may generate a resolution delta frame that indicates the differences between the first high resolution frame and the first low resolution frame. The remote server may transmit the resolution delta frame to the edge server. In an alternative embodiment, the remote server may transmit the high resolution frames it generates to the edge server, which, in turn, may generate the resolution delta frame. Transmitting the resolution delta frame from the remote server to the edge server may reduce the bandwidth requirements between the remote server and the edge server as compared to transmitting the high resolution frame from the remote server to the edge server. In either circumstance, however, the resolution delta frame or the high resolution frames generated at the remote server provide a level of detail lacking in the low resolution frames generated by the edge server.

The edge server, located geographically close to the client device, may execute a first instance of the application and may render first and second low resolution frames. The edge server and the remote server may execute the first instance and the second instance, respectively, of the application in a synchronized manner explained in more detail below. The edge server generates a motion delta frame that indicates differences between the first and second low resolution frames. The edge server may provide the client device with a high resolution transformed frame generated by transforming the low resolution second frame based at least in part on the resolution delta frame received by the remote server (or alternatively, the edge server may generate the resolution delta frame based on receiving, from the remote server, the high resolution first frame generated by the remote server). By doing so, the client device may experience the same low latency as if the remote server were located geographically close to the client device while achieving improved game graphics rendering and processing.

Figure 1:
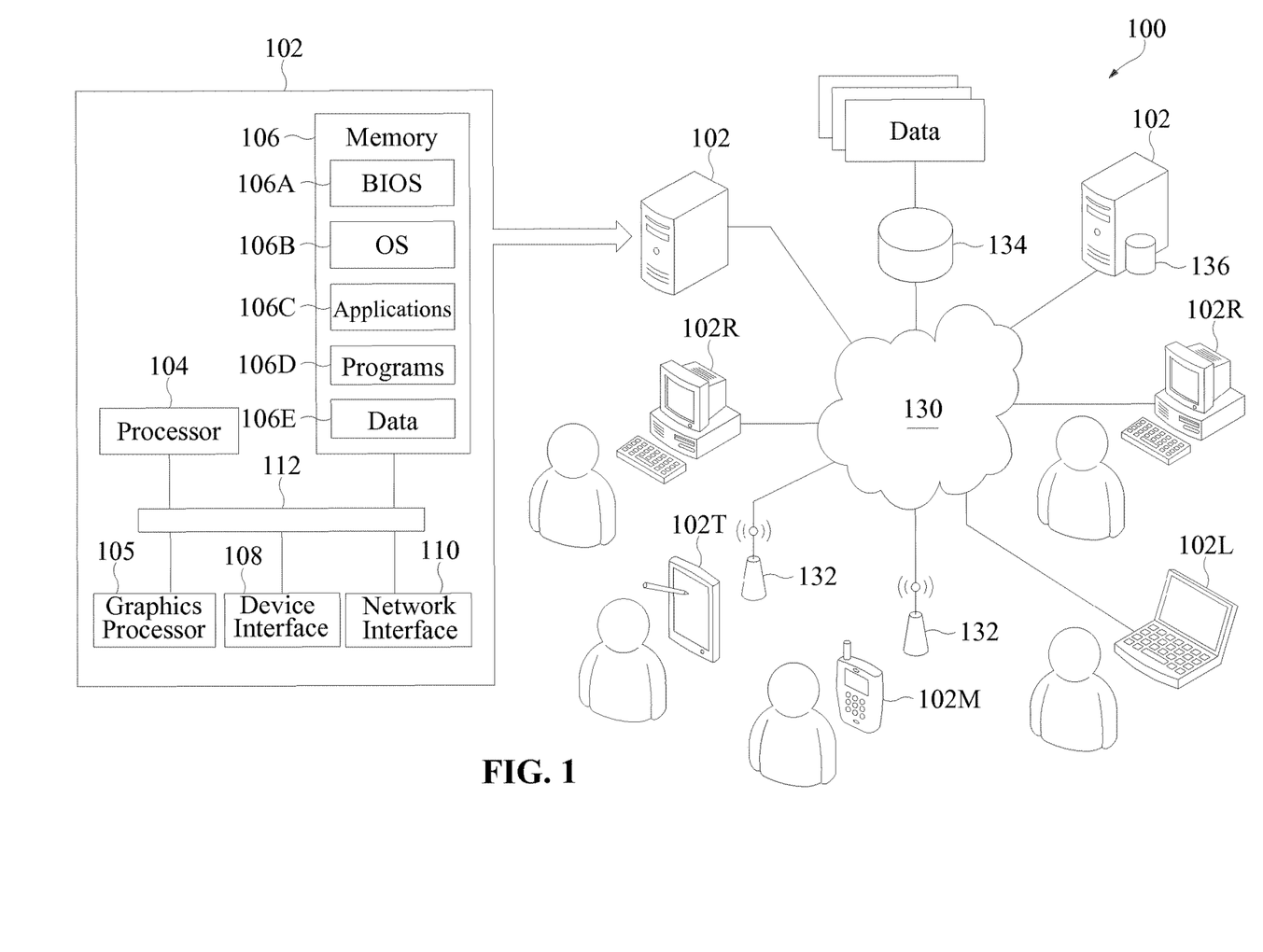
FIG. 1 diagrams an embodiment of a system according to the present disclosure.

FIG. 1 diagrams an embodiment of a system 100 according to the present disclosure. Referring to FIG. 1, system 100 includes a computing device 102 that may execute instructions defining applications, components, objects, routines, programs, instructions, data structures, virtual machines, and the like that perform particular tasks or functions or that implement particular data types. Instructions that define such applications, components, objects, routines, programs, virtual machines, and the like may be stored in memory, e.g., system memory 106, remote memory 134, or external memory 136. Some or all of the applications may be instantiated at run time by one or more processors comprised in a processing unit, e.g., processing device 104. Some or all of the applications may be interactive in that they operate in response to user input. A person of ordinary skill in the art will recognize that many of the concepts associated with the exemplary embodiment of system 100 may be implemented as computer instructions, firmware, or software in any of a variety of computing architectures, e.g., computing device 102, to achieve a same or equivalent result.

Moreover, a person of ordinary skill in the art will recognize that the exemplary embodiment of system 100 may be implemented on other types of computing architectures, e.g., general purpose or personal computers, handheld devices, mobile communication devices, gaming devices, music devices, photographic devices, multi-processor systems, microprocessor-based or programmable consumer electronics, minicomputers, mainframe computers, application specific integrated circuits, and like. For illustrative purposes only, system 100 is shown in FIG. 1 to include computing devices 102, geographically remote computing devices 102R, tablet computing device 102T, mobile computing device 102M, and laptop computing device 102L. A person of ordinary skill in the art may recognize that computing device 102 may be embodied in any of tablet computing device 102T, mobile computing device 102M, or laptop computing device 102L. Mobile computing device 102M may include mobile cellular devices, mobile gaming devices, gaming consoles, mobile reader devices, mobile photographic devices, and the like.

A person of ordinary skill in the art will recognize that an exemplary embodiment of system 100 may be implemented in a distributed computing system in which various computing entities or devices, often geographically remote from one another, e.g., computing device 102 and remote computing device 102R, perform particular tasks or execute particular applications, objects, components, routines, programs, instructions, data structures, virtual machines, and the like. For example, the exemplary embodiment of system 100 may be implemented in a server/client configuration connected via network 130 (e.g., computing device 102 may operate as a server and remote computing device 102R or tablet computing device 102T may operate as a client, all connected through network 130). Network 130 may be a single network or several logically or physically distinct networks. In distributed computing systems, applications may be stored in local memory 106, external memory 136, or remote memory 134. Local memory 106, external memory 136, or remote memory 134 may be any kind of memory, volatile or non-volatile, removable or non-removable, known to a person of ordinary skill in the art including random access memory (RAM), flash memory, read only memory (ROM), ferroelectric RAM, magnetic storage devices, optical discs, and the like.

Computing device 102 comprises processing device 104, memory 106, device interface 108, and network interface 110, which may all be interconnected through bus 112. Processing device 104 represents a single, central processing unit, or a plurality of processing units in a single or two or more computing devices 102, e.g., computing device 102 and remote computing device 102R. In some circumstances, computing device 102 may further comprise a graphics processing unit (GPU) 105 specially designed to rapidly manipulate or alter memory 106 to accelerate the creation of images in a frame buffer intended for output to a display. GPU 105 may be part of processing device 104 or distinct from processing device 104. GPU 105 may be specially designed to efficiently manipulate computer graphics and images particularly computer graphics and images comprising large blocks of data.

Local memory 106, as well as external memory 136 or remote memory 134, may be any type memory device known to a person of ordinary skill in the art including any combination of RAM, flash memory, ROM, ferroelectric RAM, magnetic storage devices, optical discs, and the like that is appropriate for the particular task. Local memory 106 may store a database, indexed or otherwise. Local memory 106 may store a basic input/output system (BIOS) 106A with routines executable by processing device 104 to transfer data, including data 106D, between the various elements of system 100. Local memory 106 also may store an operating system (OS) 106B executable by processing device 104 that, after being initially loaded by a boot program, manages other programs in the computing device 102. Memory 106 may store routines or programs executable by processing device 104, e.g., applications or programs 106C. Applications or programs 106C may make use of the OS 106B by making requests for services through a defined application program interface (API). Applications or programs 106C may be used to enable the generation or creation of any application program designed to perform a specific function directly for a user or, in some cases, for another application program. Examples of application programs include games, interactive entertainment, word processors, database programs, browsers, development tools, drawing, paint, and image editing programs, communication programs, tailored applications, and the like. Users may interact directly with computing device 102 through a user interface such as a command language or a user interface displayed on a monitor (not shown). Local memory 106 may be comprised in a processing unit, e.g., processing device 104.

Device interface 108 may be any one of several types of interfaces. Device interface 108 may operatively couple any of a variety of devices, e.g., hard disk drive, optical disk drive, magnetic disk drive, or the like, to the bus 112. Device interface 108 may represent either one interface or various distinct interfaces, each specially constructed to support the particular device that it interfaces to the bus 112. Device interface 108 may additionally interface input or output devices utilized by a user to provide direction to the computing device 102 and to receive information from the computing device 102. These input or output devices may include voice recognition devices, gesture recognition devices, touch recognition devices, keyboards, monitors, mice, pointing devices, speakers, stylus, microphone, joystick, game pad, satellite dish, printer, scanner, camera, video equipment, modem, monitor, and the like (not shown). Device interface 108 may be a serial interface, parallel port, game port, firewire port, universal serial bus, or the like.

A person of ordinary skill in the art will recognize that the system 100 may use any type of computer readable medium accessible by a computer, such as magnetic cassettes, flash memory cards, compact discs (CDs), digital video disks (DVDs), cartridges, RAM, ROM, flash memory, magnetic disc drives, optical disc drives, and the like. A computer readable medium as described herein includes any manner of computer program product, computer storage, machine readable storage, or the like.

Network interface 110 operatively couples the computing device 102 to one or more remote computing devices 102R, tablet computing devices 102T, mobile computing devices 102M, and laptop computing devices 102L, on a local, wide, or global area network 130. Computing devices 102R may be geographically remote from computing device 102. Remote computing device 102R may have the structure of computing device 102 and may operate as server, client, router, switch, peer device, network node, or other networked device and typically includes some or all of the elements of computing device 102. Computing device 102 may connect to network 130 through a network interface or adapter included in the interface 110. Computing device 102 may connect to network 130 through a modem or other communications device included in the network interface 110. Computing device 102 alternatively may connect to network 130 using a wireless device 132. The modem or communications device may establish communications to remote computing devices 102R through global communications network 130. A person of ordinary skill in the art will recognize that programs 106C might be stored remotely through such networked connections. Network 130 may be local, wide, global, or otherwise and may include wired or wireless connections employing electrical, optical, electromagnetic, acoustic, or other carriers as is known to a person of ordinary skill in the art.

The present disclosure may describe some portions of the exemplary system 100 using algorithms and symbolic representations of operations on data bits within a memory, e.g., memory 106. A person of ordinary skill in the art will understand these algorithms and symbolic representations as most effectively conveying the substance of their work to others of ordinary skill in the art. An algorithm is a self-consistent sequence leading to a desired result. The sequence requires physical manipulations of physical quantities. Usually, but not necessarily, these quantities take the form of electrical or magnetic signals capable of being stored, transferred, combined, compared, and otherwise manipulated. For simplicity, the present disclosure refers to these signals as bits, values, elements, symbols, characters, terms, numbers, or like. The terms are merely convenient labels. A person of skill in the art will recognize that terms such as computing, calculating, generating, loading, determining, displaying, or like refer to the actions and processes of a computing device, e.g., computing device 102. The computing device 102 may manipulate and transform data represented as physical electronic quantities within a memory into other data similarly represented as physical electronic quantities within the memory.

In an embodiment, system 100 may be a distributed network in which some computing devices 102 operate as servers, e.g., computing device 102, to provide content, services, or the like, through network 130 to other computing devices operating as clients, e.g., remote computing device 102R, laptop computing device 102L, tablet computing device 102T. In some circumstances, computing devices 102 may operate as servers that execute application programs offloaded from other computing devices 102 operating as clients.

Figure 2A:
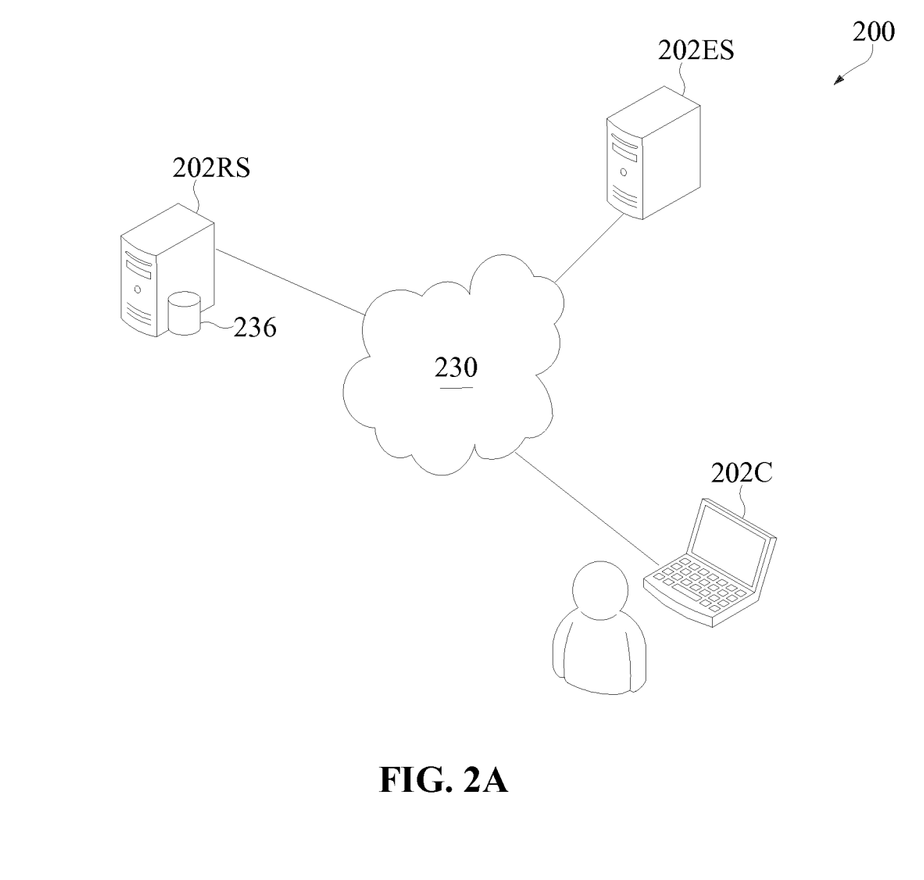
FIGS. 2A-C diagram embodiments of a system according to the present disclosure.
Figure 2B:
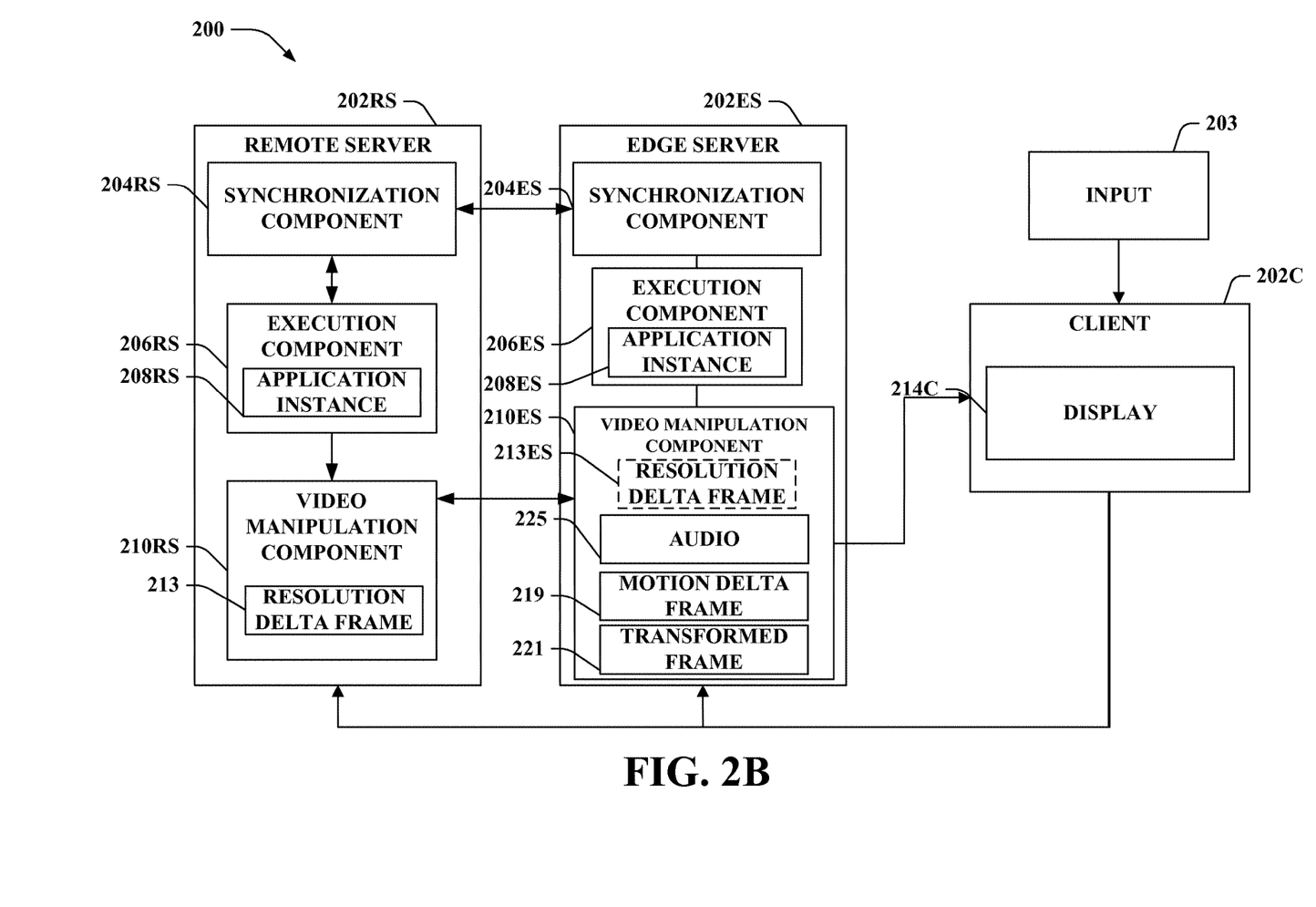
Figure 2C:
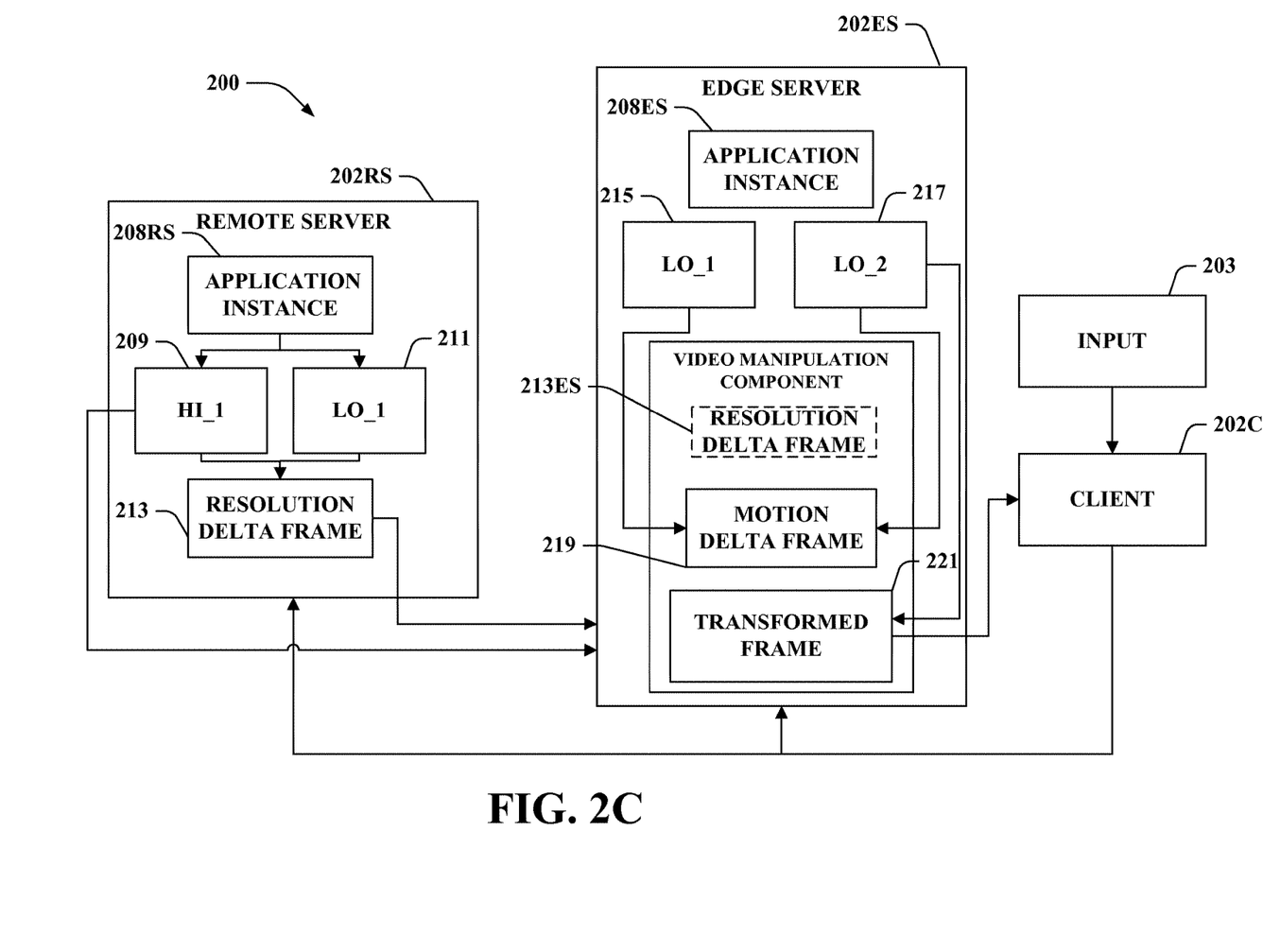

FIGS. 2A-C diagram embodiments of a system 200 according to the present disclosure. Referring to FIGS. 1 and 2A-C, a system 200 may comprise a remote server 202RS, an edge server 202ES, and a client 202C. In an embodiment, remote server 202RS, edge server 202ES, and client device 202C may be structured similarly to computing device 102 to include processing device 104, memory 106, device interface 108, bus 112, and network interface 110. Remote server 202RS may include a more powerful processing device 104, GPU 105, or larger capacity or different type of memory 106 relative to those in edge server 202ES or client device 202C or both based on various design constraints including performance, cost, size, mobility, and the like. Similarly, edge server 202ES may include a more powerful processing device 104, GPU 105, or larger capacity or different type of memory 106 relative to those in client device 202C or both based on various design constraints including performance, cost, size, mobility, and the like. In some circumstances, client device 202C may be a thin client that relies on remote server 202RS or edge server 202ES for computationally intensive tasks, e.g., rendering and processing interactive application graphics.

A user may interact with client device 202C using a graphical user interface that, in turn, transmits user input 203 to remote server 202RS and edge server 202ES via network 230. Client device 202C may transmit user input 203 to remote server 202RS and edge server 202ES in any manner known to a person of ordinary skill in the art.

For simplicity, the description below will describe remote server 202RS and edge server 202ES executing instances of an interactive application, e.g., a game, a program, or the like. Remote server 202RS and edge server 202ES may execute distinct instances of a particular interactive application, e.g., a second application instance 208RS and a first application instance 208ES. As is described in more detail below, remote server 202RS and edge server 202ES may render frames and audio corresponding to second application instance 208RS and first application instance 208ES, respectively. In an embodiment, remote server 202RS may render a first quality first frame 209 of second application instance 208RS and a second quality first frame 211 of second application instance 208RS. First quality first frame 209 may have a first quality attribute, e.g., a high resolution.

Similarly, second quality first frame 211 may have a second quality attribute, e.g., a low resolution. Note that the labels "first" and "second" as it refers to application instances, first quality, and the like are merely a convenience and not intended to denote any temporal or other relationship between the items so labeled.

Remote server 202RS may be one of a large group of networked computer servers in a datacenter located geographically remote from client device 202C. Edge server 202ES may render a second quality first frame 215 of first application instance 208ES and a second quality second frame 217 of first application instance 208ES. Second quality first frame 215 and second quality second frame 217 may have the second quality attribute, e.g., a low resolution, e.g., 320×240 pixels, lower than a high resolution, e.g., 1920× 1080 pixels. In an embodiment, second quality second frame 217 may sequentially follow second quality first frame 215 in first application instance 208ES. In an embodiment, client device 202C may not be aware of that edge server 202ES is coupled to remote server 202RS so that, e.g., client device 202C may run legacy thin client software without needing to upgrade to support the resolution boost provided by the remote server 202RS.

In an embodiment, edge server 202ES may be located geographically close to client device 202C. Client device 202C may only interact directly with edge server 202ES. As is explained in more detail below, locating edge server 202ES geographically close to client 202C may improve the perceived latency of a user interacting with the application by reducing the time between the user providing an input and the user observing a result of that input in the application while offloading computationally intensive application graphics processing to remote server 202RS. Client device 202C may interact with edge server 202ES in a known streaming model that receives a video stream in any format known to a person of ordinary skill in the art, e.g., H.264/5 stream.

Referring to FIGS. 2A-C, remote server 202RS may comprise a synchronization component 204RS, an execution component 206RS, and a video manipulation component 210RS. Synchronization component 204RS, execution component 206RS, and/or video manipulation component 210RS may be implemented in hardware, firmware, or software components, objects, circuits, devices, or the like, or a combination thereof.

Synchronization component 204RS may operate cooperatively with synchronization component 204ES in edge server 202ES to synchronize the execution of second application instance 208RS on remote server 202RS with execution of first application instance 208ES on edge server 202ES. Remote server 202RS and edge server 202ES may therefore be running distinct instances 208RS and 208ES of a same application. In an embodiment, edge server 202ES may operate as a master while remote server 202RS may operate in a synchronized or spectate mode locked to an identical user point of view. In another embodiment, edge server 202ES may synchronize game play by forwarding inputs. In yet another embodiment, edge server 202ES may operate in a real-time record and playback mode in which it forks and forwards render calls (either complete instructions or only send frame instruction deltas) to remote server 202RS, which would have copies of application assets, textures, geometries, and the like since these are costly to transfer from edge server 202ES. Remote server 202RS may execute instructions on, e.g., GPU 105, and return values are not sent back to the source and instead stored as needed to map memory/pointer locations. Many of these techniques are described in more detail in, e.g., U.S. application Ser. No. 14/603,213, titled Predictive Server-Side Rendering of Scenes, filed Jan. 22, 2015, or U.S. application Ser. No. 13/714,379, titled Server GPU Assistance For Mobile GPU Applications, filed Dec. 13, 2012, which is incorporated here by reference in its entirety.

Execution component 206RS may be configured to execute a second application instance 208RS. Execution component 206RS may generate a first quality first frame 209 of second application instance 208RS having a frame rate, e.g., 60 frames per second, and a first quality attribute, e.g., a first resolution of 1920×1080 pixels. Execution component 206RS may further generate a second quality first frame 211 of second application instance 208RS having the (same) frame rate, e.g., 60 frames per second, and a second quality attribute, e.g., a second resolution of 320×240 pixels. In an embodiment, first quality first frame 209 and second quality first frame 211 represent a same frame, e.g., a first frame, of second application instance 208RS with each having different quality attributes, e.g., a first resolution and a second resolution, respectively.

The first and second quality attributes may refer to any quality attribute of frames of application instance 208RS or 208ES that are well known to a person of ordinary skill in the art. In some circumstances, the first and second quality attributes may refer to first and second resolutions, respectively, of frames 209, 211, 215, or 217. The first resolution may be different, e.g., lower, than the first resolution. Thus, execution component 206RS may generate first quality first frame 209 and second quality first frame 211 as a high resolution first frame and a low resolution first frame, respectively, of second application instance 208RS.

In an embodiment, video manipulation component 210RS may generate a resolution delta frame 213 by identifying quality attribute differences, e.g., resolution differences, between first quality first frame 209 and second quality first frame 211. Video manipulation component 210RS may identify quality attribute differences between first quality first frame 209 and second quality first frame 211 using any video analysis techniques that are known to a person of ordinary skill in the art. Resolution delta frame 213 may aid in creating a high resolution transformed frame 221 from a low resolution second frame 217 generated by edge server 202ES.

Remote server 202RS may transmit resolution delta frame 213 to edge server 202ES via network 230 in any format known to a person of ordinary skill in the art, including H.264/5 stream. Alternatively, remote server 202RS may transmit first quality first frame 209 to edge server 202ES via network 230 in any manner known to a person of ordinary skill in the art, including H.264/5 stream.

Alternatively, remote server 202RS may transmit first quality first frame 209 to edge server 202ES and video manipulation component 210ES at the edge server 202ES may generate the resolution delta frame 213ES (FIG. 2B or 2C) at the edge server 202ES based at least in part on the first quality first frame 209 received from remote server 202RS.

Edge server 202ES may comprise a synchronization component 204ES, an execution component 206ES, and a video manipulation component 210ES. Execution component 206ES may be configured to execute a first application instance 208ES. Execution component 206ES may generate a second quality first frame 215 of first application instance 208ES having the second quality attribute, e.g., a low resolution. Execution component 206ES may further generate a second quality second frame 217 of first application instance 208ES having the second quality attribute, e.g., the low resolution. In an embodiment, execution component 206ES may generate audio 225 corresponding to first application instance 208ES. In an embodiment, second quality first frame 215 and second quality second frame 217 represent sequential frames, e.g., a first frame and a second frame, respectively, of first application instance 208ES. Execution component 206ES may generate second quality first frame 215 and second quality second frame 217 as a low resolution, e.g., 320×240 pixels, first frame 215 and a low resolution, e.g., 320×240 pixels, second frame 217.

Video manipulation component 210ES may generate a motion delta frame 219 by identifying differences, e.g., motion differences, between second quality first frame 215 and second quality second frame 217. Video manipulation component 210RS may identify motion differences between second quality first frame 215 and second quality second frame 217 using video analysis techniques that are known to a person of ordinary skill in the art, e.g., pixel-by-pixel basis, motion vectors, macro-blocks.

Video manipulation component 210ES may generate a transformed frame 221 by applying resolution delta frame 213 and motion delta frame 219 to second quality second frame 217 using any video manipulation techniques known to a person of ordinary skill in the art. Video manipulation component 210ES may transmit transformed frame 221 and audio 225 to client device 202C using any means known to a person of ordinary skill in the art for display on display 214C.

Edge server 202ES may operate in a collaborative rendering mode and an edge only mode. In the collaborative rendering mode, edge server 202ES may operate to collaboratively with remote server 208RS as is explained herein. In the edge only mode, edge server 202ES may render frames having a quality attribute supported by its hardware components without the aid of remote server 202RS. This situation may arise when, for example, remote server 202RS is not available for edge server 202ES to offload rendering.

Collaborative rendering mode between remote server 202RS and edge server 202ES allow users to experience low latencies as if remote server 202RS were located geographically close to client device 202C but with a density improvement in the edge server 202ES. Rendering performance for edge server 202ES may only determine density not capability since edge server 202ES need only render frames at a low resolution, e.g., 320×240 pixels and remote server 202RS may generate frames at a high resolution, e.g., 1920×1080 pixels, even if edge server 202ES may not natively support that high resolution.

Figure 3:
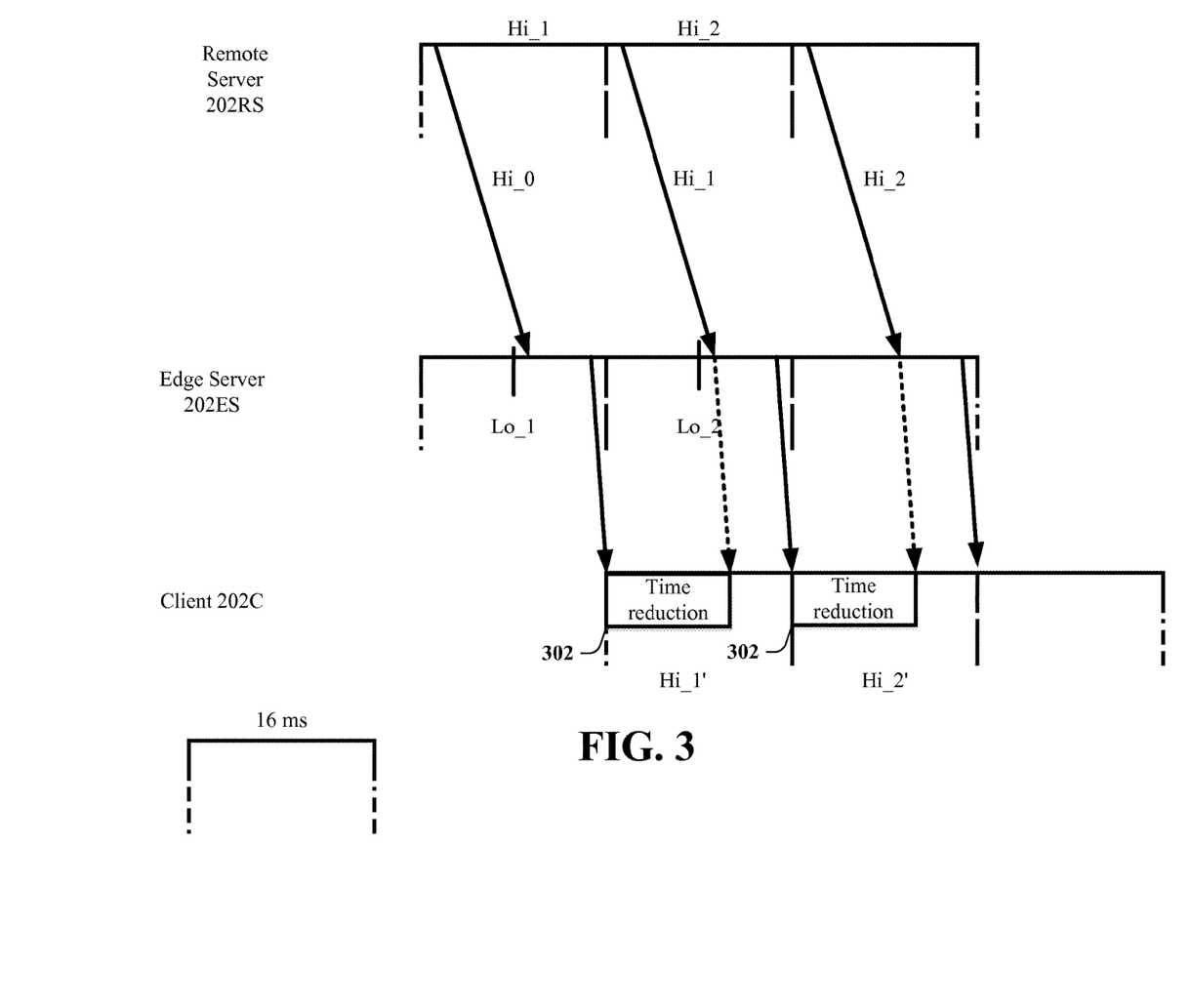
FIG. 3 diagrams an embodiment of a timeline of a system according to the present disclosure.

FIG. 3 diagrams an embodiment of a timeline according to the present disclosure. Referring to FIGS. 2A-C and 3, remote server 202RS may generate sequential high resolution frames Hi_1, Hi_2, and so on synchronous with edge server 202ES generating sequential low resolution frames Lo_1, Lo_2, and so on. In the example shown in FIG. 4, remote server 202RS and edge server 202ES generate frames every 16 ms but any frame rate comes within the scope of the disclosure. Remote server 202RS will transmit either the high resolution frame, e.g., Hi_1, or a resolution delta frame 213 to edge server 202ES during the generation of the corresponding low resolution frame, e.g., Lo_1. Edge server 202ES may generate transformed frame 221, e.g., Hi_2', by applying the resolution delta frame 213 and the motion delta frame 219 to the low resolution second frame, e.g., Lo_2. Edge server 202ES may transmit transformed frame 221, e.g., Hi_2', to client 202C. By doing so, latency is reduced as shown at 302.

Figure 4:
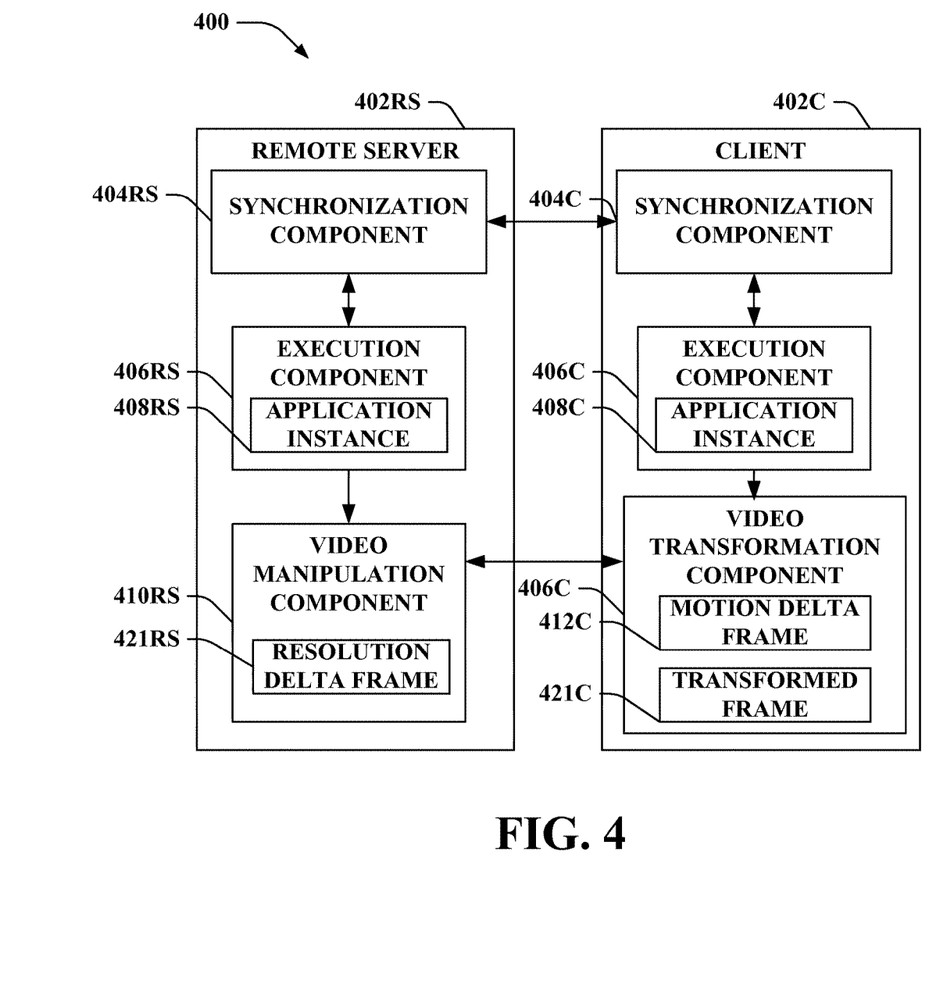
FIG. 4 diagrams an embodiment of a system according to the present disclosure.

FIG. 4 diagrams an embodiment of a system 400 according to the present disclosure. Referring to FIGS. 1 and 4, a remote server 402RS may have a similar structure as remote server 202RS including a synchronization component 404RS, execution component 406RS, and video manipulation component 410RS. Like remote server 202RS, remote server 402RS may execute a second application instance 408RS and generate a resolution delta frame 421RS. System 400 includes a client 402C that operates similarly to edge server 202ES in system 200. Client 402C includes a synchronization component 404C, execution component 406C, and vide manipulation component 410C that operate similarly to synchronization component 204ES, execution component 206ES, and video manipulation component 210ES as described above. Like edge server 202ES, client 402C may execute a first application instance 408C and generate a motion delta frame 412C and a transformed frame 421C. Collaborative rendering mode between remote server 402RS and client 402C may improve the native rendering capability of client device 402C at a small tradeoff of latency. Collaborative rendering mode may allow a client device 402C that can only render frames at a low resolution to instead interact with the application in a high resolution, e.g., 1920×1080 or 4 k pixels, by having remote server 402RS render the high resolution frames and having client device 402C do the motion transform and display.

Further, in a collaborative rendering mode could also be leveraged for a seamless 'stream to play local' scenario. In this scenario, a user starts an application stream on a local device while the application downloads in the background. Once the download is complete, the application starts on the local device, synchronizes state with the remote server, and provides the natively rendered frames to the application instead of the video stream from the service.

And further yet, in streaming spectator style latency tolerant viewing scenarios, a remote server may provide the video stream (and possibly re-encode to lower target) to viewers thereby removing any additional load from valuable high density edge servers.

Figure 5:
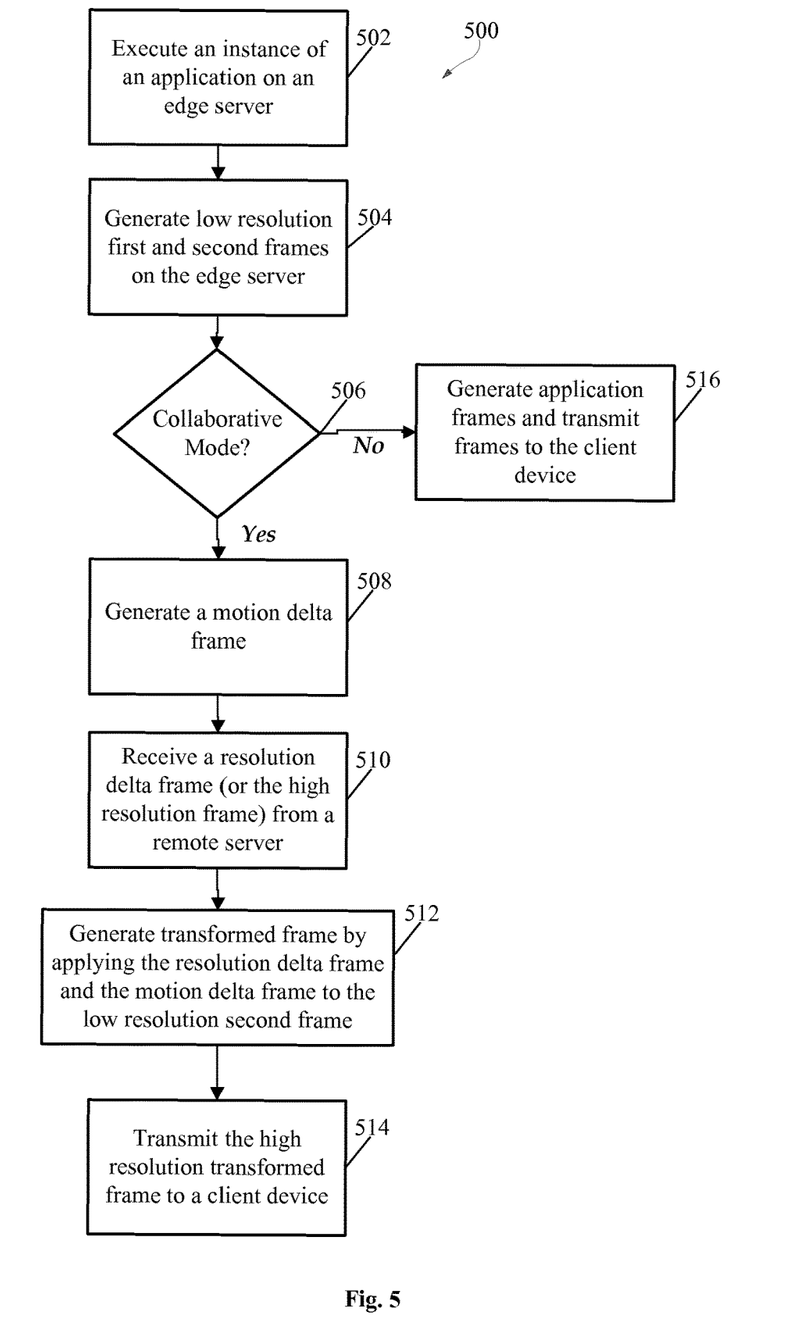
FIG. 5 diagrams an embodiment of a method according to the present disclosure.

FIG. 5 diagrams an embodiment of a method 500 according to the present disclosure. Referring to FIGS. 2A-C and 5, at 502, a method 500 executes an instance of an application on edge server 202ES. At 504, a method 500 generates a low resolution first and second frames 215, 217 of the application on edger server 202ES. At 506, method 500 determines whether edge server 202ES is operating in collaborative rendering mode, and if it is, method 500 generates a motion delta frame 219 at 508. At 510, edge server 202ES receives a resolution delta frame 213 from remote server 202RS that indicates the differences between a high resolution first frame and a low resolution first frame of an instance of the application executing on remote server 202RS synchronously with the instance of the application executing on edge server 202ES. At 512, method 500 generates a high resolution transformed frame on edge server 202ES by applying resolution delta frame 213 and motion delta frame 219 to low resolution first frame 215. At 514, method 500 transmits the transformed frame to a client device 202C. If the edge server 202ES is not operating in collaborative rendering mode at 506, method 500 generates application frames in a resolution consistent with its hardware, and transmits those frames to the client device 202C at 516.

It will also be appreciated by persons of ordinary skill in the art that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus the disclosure is limited only by the appended claims.

The invention claimed is:

1. A system, comprising:
   at least one processing device; and
   a storage device configured to store instructions that, when executed by the at least one processing device, cause the at least one processing device to:
   execute a first instance of an application;
   generate a first instance first frame and a first instance second frame corresponding to the first instance of the application, the first instance first frame and the first instance second frame each comprising a first level quality attribute;
   receive, from a remote server, a resolution delta frame identifying a difference between a second instance first quality first frame and a second instance second quality first frame corresponding to a second instance of the application executing on the remote server, the second instance first quality first frame comprising the first level quality attribute and the second instance second quality first frame comprising a second level quality attribute;
   transform the first instance second frame into a transformed frame based at least in part on applying the resolution delta frame received from the remote server to the first instance second frame, the transformed frame comprising the second quality level attribute; and
   transmit the transformed frame to a client.

2. The system of claim 1, the storage device further configured to store instructions that, when executed by the at least one processing device, cause the at least one processing device further to:
   generate a motion delta frame configured to identify a difference between the first instance first frame and the first instance second frame, the motion delta frame comprising motion compensation information; and
   transform the first instance second frame into the transformed frame based at least in part on the motion delta frame.

3. The system of claim 1,
   wherein the first level quality attribute is a first resolution; and
   wherein the second level quality attribute is a second resolution higher than the first resolution.

4. The system of claim 1, wherein the storage device further configured to store instructions that, when executed by the at least one processing device, cause the at least one processing device further to:
   substantially synchronize the first instance of the application with the second instance of the application executing on the remote server.

5. The system of claim 4,
   wherein the first instance first frame corresponds to the second instance first quality first frame executing on the remote server.

6. The system of claim 4, the storage device further configured to store instructions that, when executed by the at least one processing device, cause the at least one processing device further to:
   lock execution of the second instance of the application by the remote server to execution of the first instance of the application.

7. The system of claim 1, the storage device further configured to store instructions that, when executed by the at least one processing device, cause the at least one processing device further to:
   generate audio corresponding to the application; and
   transmit the audio to the client together with the transformed frame.

8. A method, comprising:
   executing, on an edge server, a first instance of an application;
   generating, on the edge server, a motion delta frame comprising motion compensation information to identify differences between a first frame of the first instance of the application and a second frame of the first instance of the application, the first frame of the first instance and the second frame of the first instance comprising a first level quality attribute;
   receiving, at the edge server from a remote server, a resolution delta frame identifying differences between a first quality first frame of a second instance of the application executing on the remote server and a second quality first frame of the second instance of the application executing on the remote server, the first quality first frame of the second instance comprising the first level quality attribute and the second quality first frame of the second instance comprising a second level quality attribute;
   transforming, at the edge server, the second frame of the first instance into a transformed frame based at least in part on applying the motion delta frame and the resolution delta frame to the second frame of the first instance; and
   transmitting, from the edge server, the transformed frame to a client.

9. The method of claim 8,
   wherein the motion delta frame identifies macro-block differences between the first frame of the first instance of the application and the second frame of the first instance of the application.

10. The method of claim 9,
    wherein the resolution delta frame identifies pixel-by-pixel differences between the first quality first frame of the second instance of the application and the second quality first frame of the second instance of the application.

11. The method of claim 10,
    wherein the first frame of the first instance of the application corresponds to the first quality first frame of the second instance of the application executing on the remote server.

12. The method of claim 8,
    wherein the first level quality attribute comprises a first resolution; and
    wherein the second level quality attribute comprises a second resolution.

13. The method of claim 12,
    wherein the first resolution is a lower resolution than the second resolution; and
    wherein the transformed frame comprises the second resolution.

14. The method of claim 8, further comprising:
    substantially synchronizing the first instance of the application with the second instance of the application executing on the remote server.

15. The method of claim 8, further comprising:
synchronizing the first instance of the application executing on the edge server with the second instance of the application executing on the remote server.

16. The method of claim 8, further comprising:
generating, on the edge server, audio corresponding to the application; and
transmitting, from the edge server, the audio to the client together with the transformed frame.

17. A non-transitory computer-readable medium having computer-executable instructions stored thereon that, when executed, cause one or more processors to perform operations comprising:
executing a first instance of an application;
receiving, from a remote server, a resolution delta frame that indicates differences between a first resolution first frame of a second instance of the application executing on the remote server and a second resolution first frame of the second instance of the application executing on the remote server;
identifying a first resolution second frame of the first instance of the application;
transforming the first resolution second frame of the first instance into a second resolution transformed frame by applying the resolution delta frame to the first resolution second frame of the first instance of the application; and
transmitting the second resolution transformed frame to a client, the first resolution second frame of the first instance and a first resolution first frame of the second instance comprising a first resolution and the second resolution first frame of the second instance comprising a second resolution higher than the first resolution.

18. The non-transitory computer-readable medium of claim 17, wherein the operations further comprise:
generating a motion delta frame to identify differences between a first resolution first frame of the first instance and the first resolution second frame of the first instance; and
transforming the first resolution second frame of the first instance into the second resolution transformed frame based at least in part on the motion delta frame.

19. The non-transitory computer-readable medium of claim 17, wherein the operations further comprise:
synchronizing the second instance of the application executing on the remote server with the first instance of the application.

20. The non-transitory computer-readable medium of claim 17, wherein the operations further comprise:
generating audio corresponding to the second instance of the application; and
transmitting the audio to the client.

* * * * *